United States Patent
Shimizu et al.

(10) Patent No.: US 9,337,459 B2
(45) Date of Patent: May 10, 2016

(54) SEALED SECONDARY BATTERY

(71) Applicant: PANASONIC CORPORATION, Osaka (JP)

(72) Inventors: Keisuke Shimizu, Osaka (JP); Tomohiko Yokoyama, Osaka (JP); Masato Fujikawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 84 days.

(21) Appl. No.: 14/344,545

(22) PCT Filed: Sep. 28, 2012

(86) PCT No.: PCT/JP2012/006239
§ 371 (c)(1),
(2) Date: Mar. 12, 2014

(87) PCT Pub. No.: WO2013/046712
PCT Pub. Date: Apr. 4, 2013

(65) Prior Publication Data
US 2014/0377599 A1 Dec. 25, 2014

(30) Foreign Application Priority Data
Sep. 29, 2011 (JP) .................................. 2011-214835

(51) Int. Cl.
*H01M 2/12* (2006.01)
*H01M 2/02* (2006.01)
*H01M 2/04* (2006.01)
*H01M 2/34* (2006.01)
*H01M 10/04* (2006.01)
*H01M 2/08* (2006.01)

(52) U.S. Cl.
CPC .............. *H01M 2/1241* (2013.01); *H01M 2/02* (2013.01); *H01M 2/04* (2013.01); *H01M 2/08* (2013.01); *H01M 2/12* (2013.01); *H01M 2/34* (2013.01); *H01M 10/04* (2013.01)

(58) Field of Classification Search
CPC ....... H01M 2/1241; H01M 2/08; H01M 2/12; H01M 2/02; H01M 2/34; H01M 2/04; H01M 10/04; Y02E 60/12
See application file for complete search history.

(56) References Cited

U.S. PATENT DOCUMENTS

| | | | |
|---|---|---|---|
| 5,462,820 A * | 10/1995 | Tanaka ........................ 429/174 |
| 2007/0026315 A1* | 2/2007 | Lampe-Onnerud et al. .. 429/224 |
| 2009/0208820 A1* | 8/2009 | Nishino et al. .................. 429/56 |

FOREIGN PATENT DOCUMENTS

| | | | | |
|---|---|---|---|---|
| JP | H06-187957 | * | 7/1994 | ............. H01M 2/12 |
| JP | 11-007930 A | | 1/1999 | |

(Continued)

OTHER PUBLICATIONS

International Search Report issued in International Application No. PCT/JP2012/006239 mailed Nov. 6, 2012, with English translation, 5 pgs.

*Primary Examiner* — Patrick Ryan
*Assistant Examiner* — Aaron Greso
(74) *Attorney, Agent, or Firm* — McDermott Will & Emery LLP

(57) ABSTRACT

An electrode group formed by winding a positive electrode plate and a negative electrode plate with a separator interposed therebetween is housed in a battery case, and a sealing plate seals an opening of the battery case. The sealing plate includes an upper metal plate, a valve, and a lower metal plate that are stacked, an insulating plate is placed on a portion of the electrode group near the opening of the battery case, one of the positive electrode plate or the negative electrode plate of the electrode group is connected to the lower metal plate through a lead, the lower metal plate and the insulating plate have a first opening and a second opening, respectively, and a ratio of S2 is within the range of 1.8-3.3, where S1 represents an area of the first opening, and S2 represents an area of the second opening.

8 Claims, 3 Drawing Sheets

(56) References Cited

FOREIGN PATENT DOCUMENTS

| JP | 2000-348771 A | 12/2000 | | |
| JP | 2002-100375 A | 4/2002 | | |
| JP | 2002-231314 A | 8/2002 | | |
| JP | 2003-187776 A | 7/2003 | | |
| JP | 2009-245650 A | 10/2009 | | |
| WO | WO 2007/114245 | * | 10/2007 | ............ H01M 10/40 |

* cited by examiner

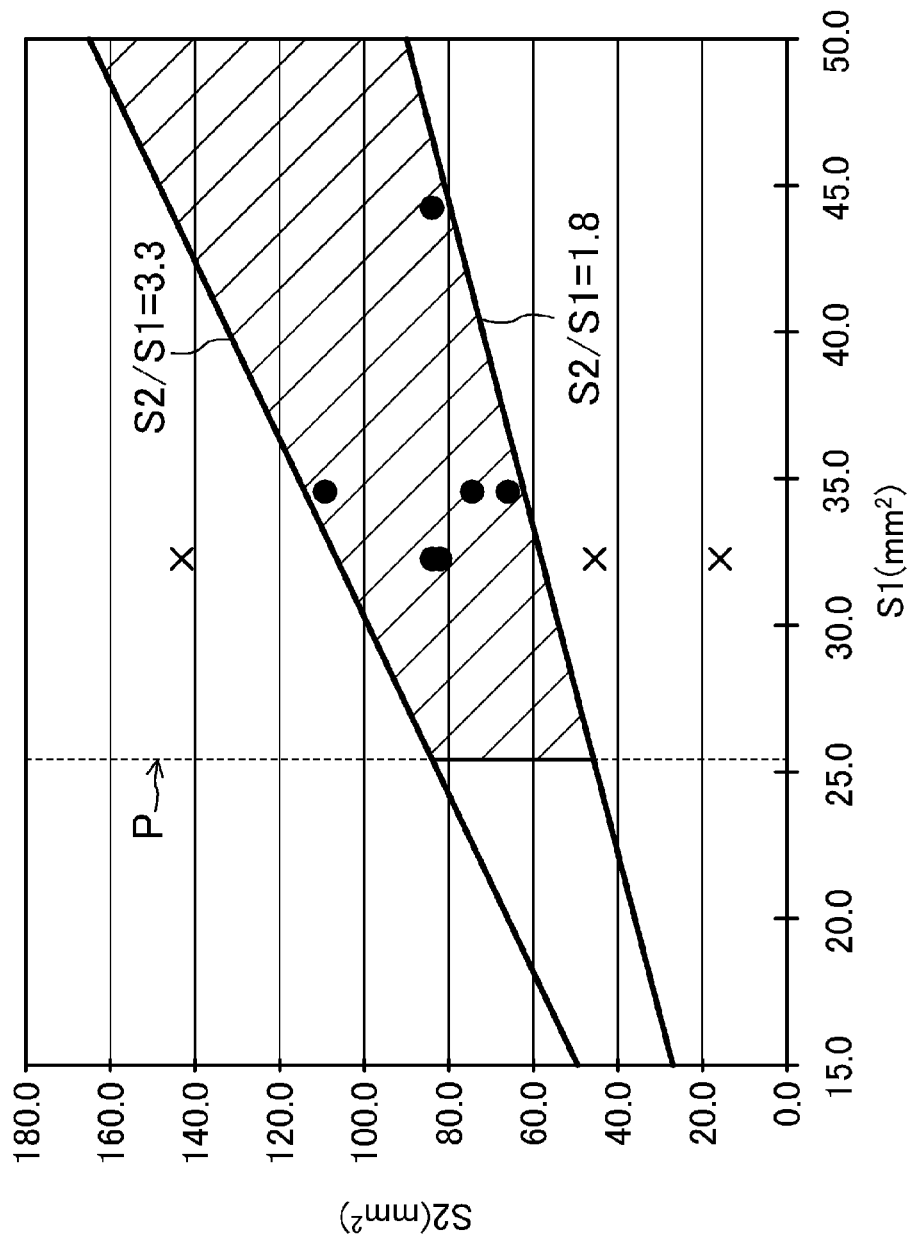

SEALED SECONDARY BATTERY

RELATED APPLICATIONS

This application is the U.S. National Phase under 35 U.S.C. §371 of International Application No. PCT/JP2012/006239, filed on Sep. 28, 2012, which in turn claims the benefit of Japanese Application No. 2011-214835, filed on Sep. 29, 2011, the disclosures of which are incorporated by reference herein.

TECHNICAL FIELD

The present disclosure relates to improved sealed secondary batteries each including a safety valve through which gas generated in the battery is released to outside the battery.

BACKGROUND ART

Sealed secondary batteries that can be charged and discharged have high energy density. When an internal or external short circuit occurs, or the battery experiences abnormal heat generation or impact, charge/discharge reaction or chemical reaction occurs rapidly in the battery to cause rapid gas generation. This may expand or break a battery case. For this reason, most of the sealed secondary batteries are provided with a safety valve (an explosion-proof mechanism) through which the gas generated in the battery is released to outside the battery when the internal pressure of the battery reaches a predetermined value.

In contrast, known sealed secondary batteries with enhanced energy density each include an electrode group formed by winding or stacking a positive electrode plate and a negative electrode plate with a separator interposed therebetween, and a battery case in which the electrode group and an electrolyte are housed. Here, a sealing plate includes a safety valve, and seals an opening of the battery case with a gasket interposed therebetween. The positive electrode plate is connected through a positive electrode lead to the sealing plate, and the negative electrode plate is connected through a negative electrode lead to the inside bottom of the battery case. In this case, insulating plates are placed above and under the electrode group. These insulating plates prevent the electrode group from moving or being deformed in the battery case, and prevent the positive or negative electrode plate from being in contact with the negative or positive electrode lead, respectively, or the battery case to prevent an internal short-circuit.

Incidentally, when, in a sealed secondary battery with enhanced energy density, an electrode group is deformed due to an abrupt increase in internal temperature and pressure of the battery under abnormal conditions such as an internal short circuit, and thus blocks a safety valve, a battery case may rupture.

To address this problem, PATENT DOCUMENT 1 proposes a structure in which an insulating plate placed above the electrode group is made of phenol resin including glass cloth as a base. This insulating plate has high thermal resistance and high strength, and thus, prevents the deformation of the electrode group.

CITATION LIST

Patent Document

PATENT DOCUMENT 1: Japanese Unexamined Patent Publication No. 2002-231314

SUMMARY OF THE INVENTION

Technical Problem

However, in a situation where a material having high thermal resistance and high strength is used as a material of an insulating plate placed above an electrode group, when the internal pressure of a battery has abruptly increased, a battery case itself may rupture unless, even if a safety valve operates, the internal pressure of the battery can be quickly released. Furthermore, when the abruptly increased pressure acts directly on a sealing plate, the sealing plate itself may be detached from the battery case.

It is therefore a principal object of the present disclosure to provide a sealed secondary battery that enables the safe release of abnormal gas generated in the battery to outside the battery even in a situation where the internal pressure of the battery has abnormally increased.

Solution to the Problem

A sealed secondary battery according to the present disclosure is directed to a sealed secondary battery in which an electrode group formed by winding or stacking a positive electrode plate and a negative electrode plate with a separator interposed therebetween is housed in a battery case. A sealing plate seals an opening of the battery case with a gasket interposed therebetween, the sealing plate includes an upper metal plate, a valve, and a lower metal plate that are stacked, an insulating plate is placed on a portion of the electrode group near the opening of the battery case, one of the positive electrode plate or the negative electrode plate of the electrode group is connected to the lower metal plate through a lead, the lower metal plate and the insulating plate have a first opening and a second opening, respectively, and a ratio of $S2/S1$ is within the range of 1.8-3.3, where $S1$ represents an area of the first opening, and $S2$ represents an area of the second opening.

In a preferred embodiment, the first opening of the lower metal plate may have an area that is greater than or equal to 10% of a cross-sectional area of the battery case.

In another preferred embodiment, the insulating plate may be retained by a recessed portion of a side wall of the battery case. The insulating plate is preferably made of glass phenolic resin.

ADVANTAGES OF THE INVENTION

The present disclosure can provide a sealed secondary battery that enables the safe release of abnormal gas generated in the battery to outside the battery even in a situation where the internal pressure of the battery abnormally has increased.

BRIEF DESCRIPTION OF THE DRAWINGS

FIG. 2 is a graph illustrating the relationship between the area of a first opening of a lower metal plate and the area of a second opening of an insulating plate.

DESCRIPTION OF EMBODIMENTS

An embodiment of the present disclosure will be described in detail hereinafter with reference to the drawings. The present disclosure is not limited to the following embodiment. Various changes and modifications may be made without departing from the scope of the invention. The following embodiment may be combined with other embodiments.

Figure 1:
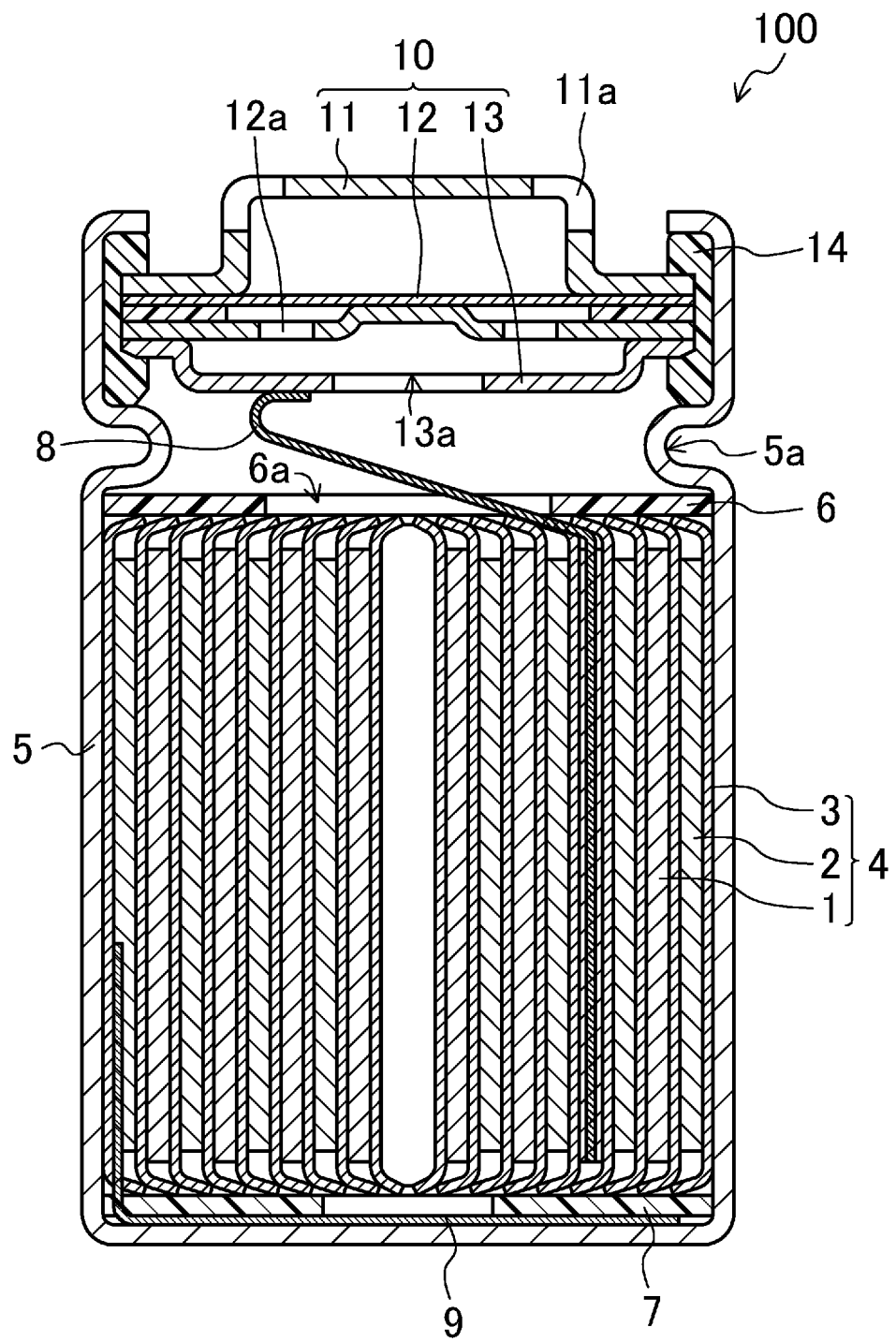
FIG. 1 is a cross-sectional view illustrating the configuration of a sealed secondary battery according to an embodiment of the present disclosure.

FIG. 1 is a cross-sectional view schematically illustrating the configuration of a sealed secondary battery 100 according to the embodiment of the present disclosure.

As illustrated in FIG. 1, an electrolyte and an electrode group 4 formed by winding a positive electrode plate 1 and a negative electrode plate 2 with a separator 3 interposed therebetween are housed in a battery case 5. A sealing plate 10 seals an opening of the battery case 5 with a gasket 14 interposed therebetween. The sealing plate 10 includes an upper metal plate (serving as a positive electrode terminal) 11, a valve 12, and a lower metal plate 13 that are stacked. The positive electrode plate 1 is connected through a positive electrode lead 8 to the lower metal plate 13, and the negative electrode plate 2 is connected through a negative electrode lead 9 to the inside bottom of the battery case 5. Insulating plates 6 and 7 are placed above and under the electrode group 4, respectively. The insulating plate 6 placed above the electrode group 4 is retained by a recessed portion 5a of the side wall of the battery case 5.

The lower metal plate 13 and the insulating plate 6 have a first opening 13a and a second opening 6a, respectively. The upper metal plate 11 also has a vent 11a communicating with outside the battery. Here, when abnormal gas is generated in the battery case 5, and the internal pressure of the battery case 5 exceeds a predetermined value, the valve 12 breaks, and the gas generated in the battery case 5 is released through the second opening 6a of the insulating plate 6, the first opening 13a of the lower metal plate 13, an opening 12a of the valve 12, and the vent 11a of the upper metal plate 11 to outside the battery.

The gas release mechanism for the abnormal gas generated in the battery case 5 has not been designed in consideration of the gas release capacity at which gas can be released through each of the openings to safely release the abnormal gas to outside the battery to address an abrupt increase in pressure. Specifically, since the insulating plate 6 needs to prevent the deformation of the electrode group as described above, the area of the second opening 6a of the insulating plate 6 has been determined in consideration of the required strength of the insulating plate 6. The area of the first opening 13a of the lower metal plate 13 has been also determined in consideration of the efficiency of current collection required to increase energy.

However, the inventors of this application found that if the area of the opening 13a of the lower metal plate 13 and the area of the opening 6a of the insulating plate 6 are separately determined without consideration of the gas release capacity of the first opening 13a and the gas release capacity of the second opening 6a, the abnormal gas generated in the battery case 5 may not be safely released to outside the battery.

For example, when the gas release capacity of the first opening 13a of the lower metal plate 13 is not adapted to the gas release capacity of the second opening 6a of the insulating plate 6, an excessive pressure may act on the sealing plate 10 including the lower metal plate 13 to cause the sealing plate 10 to fly from the battery 100. On the other hand, when the gas release capacity of the second opening 6a of the insulating plate 6 is not adapted to the gas release capacity of the first opening 13a of the lower metal plate 13, the internal pressure of the battery case 5 may excessively increase to cause the battery case 5 to rupture.

The present disclosure has been made based on the finding. In the present disclosure, in order to safely release abnormal gas generated in a battery to outside the battery in a situation where the internal pressure of the battery has abnormally increased, the relationship between the area of a first opening 13a of a lower metal plate 13 and the area of a second opening 6a of an insulating plate 6 is determined, thereby appropriately designing the gas release mechanism.

The inventors of this application fabricated the sealed secondary battery 100 illustrated in FIG. 1 to determine the above relationship, and studied the relationship among the area of the first opening 13a of the lower metal plate 13, the area of the second opening 6a of the insulating plate 6, and the gas release capacity of the battery obtained when the internal pressure of the battery has abnormally increased.

To study the relationship, a lithium ion secondary battery configured as described below was fabricated.

Slurry obtained by dispersing a positive electrode active material that is lithium nickelate, a binder made of polyvinylidene fluoride (PVDF), and a conductive agent made of acetylene black into a solvent was applied onto a current collector made of aluminum, and the resultant object was dried and then rolled to fabricate a positive electrode plate 1.

Slurry obtained by dispersing a negative electrode active material that is graphite and a binder made of styrene-butadiene rubber into a solvent was applied onto a current collector made of copper foil, and the resultant object was dried and then rolled to fabricate a negative electrode plate 2.

The obtained positive electrode plate 1 and the obtained negative electrode plate 2 were wound with a separator 3 of polyethylene interposed therebetween to fabricate an electrode group 4. The electrode group 4 is housed in a cylindrical battery case 5 having an outside diameter of 18 mm, and a sealing plate 10 sealed an opening of the battery case 5 with a gasket 14 interposed therebetween to fabricate a lithium ion secondary battery 100.

An upper metal plate 11, a valve 12, and a lower metal plate 13 forming the sealing plate 10 were made of 0.4-mm-thick iron, 0.15-mm-thick aluminum, and 0.4-mm-thick aluminum, respectively. An insulating plate 6 was made of 0.3-mm-thick glass phenolic resin.

Here, batteries were fabricated such that their lower metal plates 13 have first openings 13a with different areas S1, and their insulating plates 6 have second openings 6a with different areas S2. A safety test was conducted on the batteries.

Here, in the safety test, heat was applied from the outside to each battery at 200° C. to force the battery to be in a thermal runaway state, and whether or not a sealing plate 10 flew and whether or not a battery case 5 ruptured were examined.

FIG. 2 is a graph illustrating results of the examination. Filled circles in FIG. 2 show batteries in each of which the sealing plate 10 did not fly and the battery case 5 did not rupture, and crosses therein show batteries in each of which the sealing plate 10 flew or the battery case 5 ruptured.

As illustrated in FIG. 2, the sealing plate 10 of each of the batteries in which the ratio of S2/S1 was within the range of 1.8-3.3 did not fly, and the battery case 5 thereof did not rupture. In contrast, the sealing plate 10 of the battery in which the ratio of S2/S1 was greater than 3.3 flew, and the battery case 5 of each of the batteries in which the ratio of S2/S1 was less than 1.8 ruptured.

Consequently, in order to safely release abnormal gas generated in the battery to outside the battery in a situation where the internal pressure of the battery abnormally has increased, the ratio of S2/S1, which represents the relationship between the area S1 of the first opening 13a of the lower metal plate 13 and the area S2 of the second opening 6a of the insulating plate 6, is preferably within the range of 1.8-3.3.

Incidentally, in the present disclosure, the area S1 of the first opening 13a of the lower metal plate 13 is determined to be less than the area S2 of the second opening 6a of the insulating plate 6. Thus, the gas release capacity of the battery itself is determined by the lower metal plate 13 having an opening with a small area. For this reason, the battery itself needs to ensure a predetermined gas release capacity, and the predetermined gas release capacity of the battery itself can be defined by the ratio of the area S1 of the first opening 13a of the lower metal plate 13 to the cross-sectional area of the battery case 5.

While the gas release capacity required of the battery itself varies depending on the type of the battery, the first opening 13a of the lower metal plate 13 typically preferably has an area that is greater than or equal to 5% of the cross-sectional area of the battery case 5.

For example, in the case of lithium ion secondary batteries, the amount of gas generated in a battery including a Li—Ni based compound oxide such as $LiNiO_2$ as a positive electrode active material under abnormal conditions per unit time is larger than that in a battery including a Li—Co based compound oxide such as $LiCoO_2$ thereas. Thus, in the lithium ion secondary battery including a Li—Ni based compound oxide as a positive electrode active material, the area S1 of a first opening 13a of a lower metal plate 13 is preferably greater than or equal to 10% of the cross-sectional area of a battery case 5. The cross-sectional area of the battery case 5 of each of the batteries illustrated in FIG. 2 is about 254 $mm^2$ For this reason, in order to safely release abnormal gas generated in the battery to outside the battery, the area S1 of the first opening 13a of the lower metal plate 13 is preferably greater than or equal to 25.4 $mm^2$ (the broken line shown by P in FIG. 2).

In the present disclosure, for example, the material and shape of the lower metal plate 13 and the material and shape of the insulating plate 6 are not specifically limited. The shape of each of the openings 13a and 6a may be also optional.

Figure 3A:
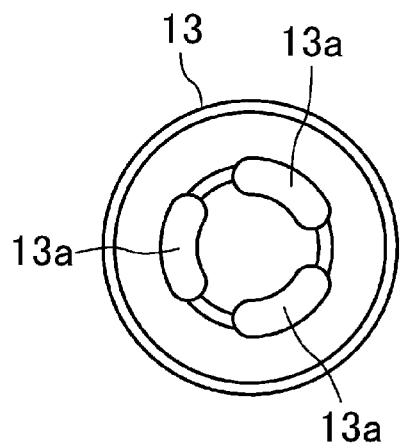
FIGS. 3A-3D are plan views each illustrating the shape of the lower metal plate or the shape of the insulating plate.
Figure 3C:
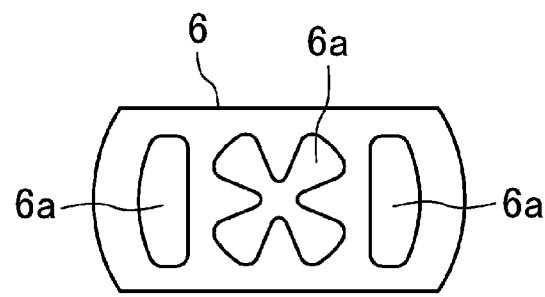
Figure 3B:
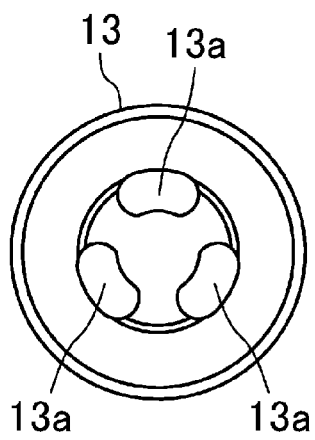
Figure 3D:
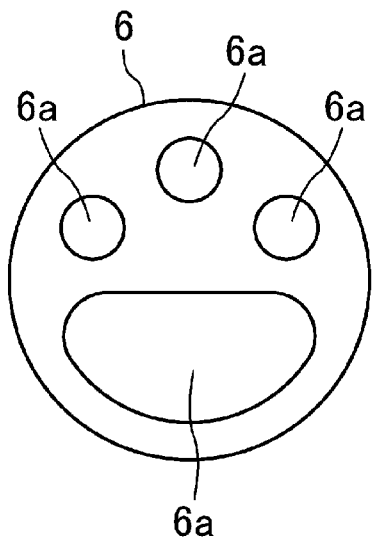

FIGS. 3A-3D are plan views each illustrating an example shape of the lower metal plate 13 or an example shape of the insulating plate 6. FIGS. 3A and 3B illustrate the shape of each of the lower metal plate 13 and the first opening 13a, and FIGS. 3C and 3D illustrate the shape of each of the insulating plate 6 and the second opening 6a.

The present disclosure has been described by way of the preferred embodiment. However, such description of the embodiment should not be construed as limiting, and thus, various modifications can be made thereto. For example, although the lithium ion secondary battery has been described as an example sealed secondary battery in the above embodiment, the sealed secondary battery of the present disclosure is not limited thereto, and the present disclosure can be applied also to other nonaqueous electrolyte secondary batteries, such as a nickel hydride storage battery.

In the embodiment, an electrode group 4 formed by winding a positive electrode plate 1 and a negative electrode plate 2 with a separator 3 interposed therebetween was used. However, an electrode group 4 formed by stacking a positive electrode plate 1 and a negative electrode plate 2 with a separator 3 interposed therebetween may be used.

Although a cylindrical secondary battery was described as an example sealed secondary battery in the above embodiment, the sealed secondary battery of the present disclosure is not limited thereto, and may be, for example, a rectangular secondary battery.

INDUSTRIAL APPLICABILITY

A sealed secondary battery according to the present disclosure is useful as a power source for driving automobiles, electric motorcycles, or electric play equipment.

DESCRIPTION OF REFERENCE CHARACTERS

1 POSITIVE ELECTRODE PLATE
2 NEGATIVE ELECTRODE PLATE
3 SEPARATOR
4 ELECTRODE GROUP
5 BATTERY CASE
5A RECESSED PORTION
6, 7 INSULATING PLATE
6A SECOND OPENING
8 POSITIVE ELECTRODE LEAD
9 NEGATIVE ELECTRODE LEAD
10 SEALING PLATE
11 UPPER METAL PLATE (POSITIVE ELECTRODE TERMINAL)
11A VENT
12 VALVE
12A OPENING
13 LOWER METAL PLATE
13A FIRST OPENING
14 GASKET
100 SEALED SECONDARY BATTERY

The invention claimed is:

1. A sealed secondary battery in which an electrode group formed by winding or stacking a positive electrode plate and a negative electrode plate with a separator interposed therebetween is housed in a battery case, wherein
   a sealing plate seals an opening of the battery case with a gasket interposed therebetween,
   the sealing plate includes an upper metal plate, a valve, and a lower metal plate that are stacked,
   an insulating plate is placed on a portion of the electrode group near the opening of the battery case,
   one of the positive electrode plate or the negative electrode plate of the electrode group is connected to the lower metal plate through a lead,
   the lower metal plate and the insulating plate have a first opening and a second opening, respectively, and
   a ratio of S2/S1 is within the range of 1.8-3.3, where S1 represents an area of the first opening, and S2 represents an area of the second opening.

2. The sealed secondary battery of claim 1, wherein the first opening of the lower metal plate has an area that is greater than or equal to 10% of a cross-sectional area of the battery case.

3. The sealed secondary battery of claim 1, wherein the insulating plate is retained by a recessed portion of a side wall of the battery case.

4. The sealed secondary battery of claim 1, wherein the insulating plate is made of glass phenolic resin.

5. The sealed secondary battery of claim 2, wherein the insulating plate is retained by a recessed portion of a side wall of the battery case.

6. The sealed secondary battery of claim 1, wherein the first opening of the lower metal plate has an area that is greater than or equal to 5% of a cross-sectional area of the battery case.

7. The sealed secondary battery of claim 1, wherein the first opening of the lower metal plate comprises a plurality of openings.

8. The sealed secondary battery of claim 1, wherein the second opening of the insulating plate comprises a plurality of openings.

\* \* \* \* \*